May 20, 1930.  W. H. LAUB  1,759,054
ANIMAL CATCHING AND HOLDING TOOL
Filed Oct. 5, 1928
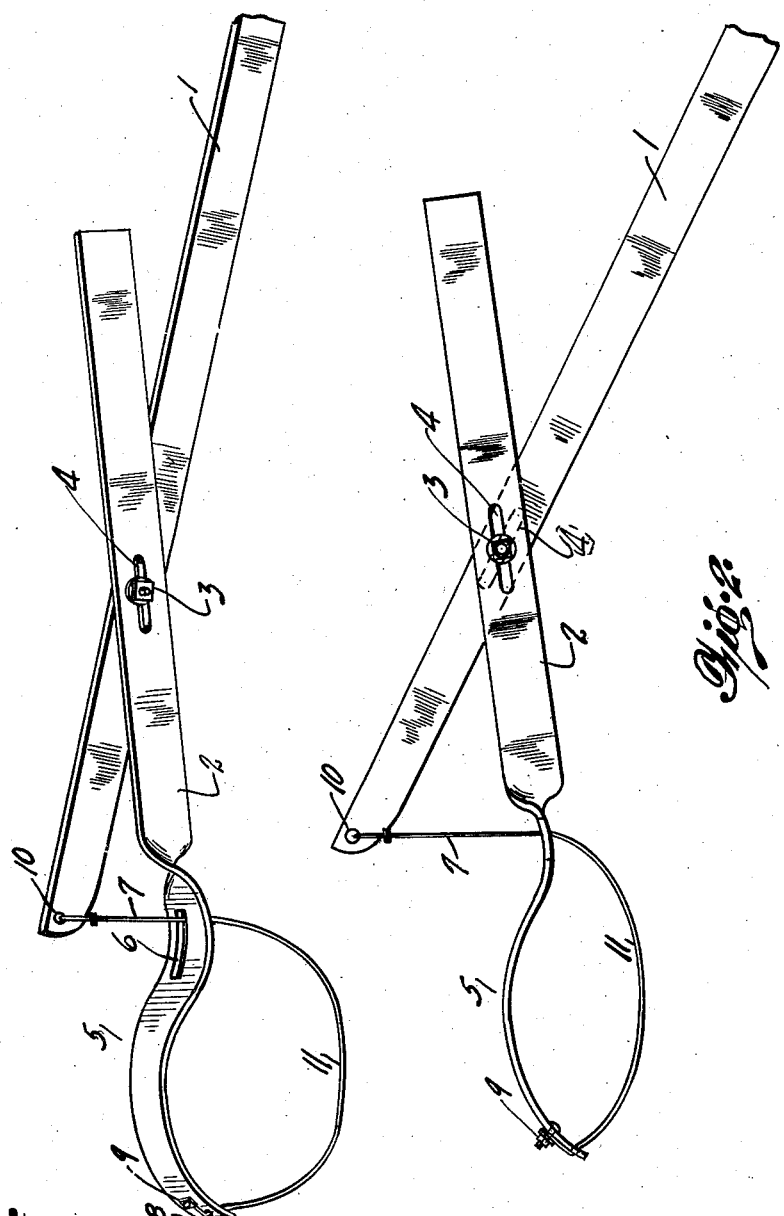
Inventor
William H. Laub.
By Adam E. Fisher.
Attorney Patented May 20, 1930

1,759,054

UNITED STATES PATENT OFFICE

WILLIAM H. LAUB, OF NEW RICHMOND, OHIO

ANIMAL CATCHING AND HOLDING TOOL

Application filed October 5, 1928. Serial No. 310,515.

This invention relates to animal catching and holding tools and the main object is to provide a simple and efficient device for grasping the nose or snout of a hog or other animal in order to hold the animal while ringing or giving medicine.

The foregoing and other objects of the invention together with means whereby the same may be carried into effect will best be understood from the following description taken in connection with the accompanying drawing in which:

Figure 1 is a perspective view of the device partially broken away; and

Figure 2 is a side view thereof.

In carrying out the invention I provide the elongated flat handle member 1 to which is fulcrumed the lever 2 by means of a bolt 3 passed through the slots 4 thus allowing the fulcrum point to be adjusted. The nose engaging tongue 5 of the lever 2 extends longitudinally from the end of the handle 1 and is twisted a quarter turn as shown. This nose engaging tongue 5 is given an arcuate shape as shown and is provided with an elongated slot 6 through its inner portion. A wire or cable noose denoted generally at 7 is passed through an aperture 8 in the outer portion of the tongue 5 and is secured to a bolt 9, the other end of the noose being then passed through the slot 6 and secured in an aperture 10 in the end of the handle 1 in such manner that it will form a loop 11 as shown which may be contracted or tightened by proper manipulation of the handle and lever. The length of this loop is readily adjustable by means of the bolt 9 as will be understood.

In use the device is placed upon the animal's nose with the arcuate nose engaging tongue 5 upon the outer side thereof and the loop 11 passed through its mouth across its teeth. By forcing the lever 2 away from the handle 1 the loop 11 will be tightened so that the animal cannot escape and it will be held in such manner that it may be readily given medicine, ringed or the like.

While I have herein set forth a certain preferred embodiment of my invention, it is understood that I may vary from the same in minor details, not departing from the spirit of the invention and within the scope of the appended claim.

I claim:

In a tool of the class described, a handle member, a lever adjustably fulcrumed thereon, an arcuate nose engaging tongue longitudinally extended from the end of the lever and having a slot adjacent the lever, and a noose secured at one end to the outer end of the tongue and passed through the said slot and secured to the end of the handle member.

In testimony whereof I affix my signature.

WILLIAM H. LAUB.